Patented May 6, 1941

2,240,668

UNITED STATES PATENT OFFICE 2,240,668

PROCESS FOR THE PRODUCTION OF CHLORINE

Donald L. Reed, Silver Spring, Md., assignor to Henry A. Wallace, Secretary of Agriculture of the United States of America, and his successors in office No Drawing. Application August 18, 1938, Serial No. 225,567

3 Claims. (Cl. 23—219)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the decomposition and oxidation of nitrosyl chloride, hydrogen chloride or their mixtures, by oxygen or oxygen containing gas to form chlorine, nitrogen peroxide, nitric acid and water. In my method of oxidation I do not utilize the principle of thermal dissociation of nitrosyl chloride and hydrogen chloride and hence I am able to accomplish the oxidation at temperatures below those required for thermal decomposition. The reactions involved in my process are those occurring at moderate temperatures in aqueous solutions of the reacting materials.

An object of my invention is the production of chlorine and the recovery of fixed nitrogen from the gaseous products resulting from the manufacture of potassium nitrate from potassium chloride and nitric acid.

Another object of my invention is the partial separation of chlorine from the nitrogen peroxide resulting from the reaction of hydrogen chloride and nitrosyl chloride and oxygen in the presence of moisture.

Still another object of my invention is a simplified technique in the oxidation of nitrosyl chloride and hydrogen chloride.

Nitrosyl chloride reacts vigorously with water to yield hydrogen chloride and nitrous acid as indicated in Equation 1.

1. 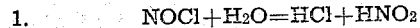 $NOCl + H_2O = HCl + HNO_2$

If the absorption of nitrosyl chloride in water is carried out in the presence of oxygen, an aqueous mixture of hydrochloric and nitric acids is obtained in accordance with Equation 2.

2. 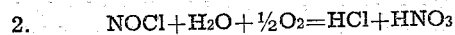 $NOCl + H_2O + \tfrac{1}{2}O_2 = HCl + HNO_3$

The solution produced in this manner may be made to undergo the well known aqua regia reaction of Equation 3.

3.  $3HCl + HNO_3 = NOCl + Cl_2 + 2H_2O$

If the nitric acid is sufficiently concentrated it may also react with nitrosyl chloride according to Equation 4.

4. 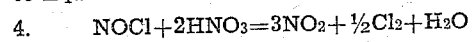 $NOCl + 2HNO_3 = 3NO_2 + \tfrac{1}{2}Cl_2 + H_2O$

The net result of these reactions is a complex gas mixture consisting chiefly of chlorine, nitrogen peroxide, nitric acid and water with unreacted materials.

The basis of my invention is the discovery of a particular set of conditions favoring the oxidation of nitrosyl chloride, hydrogen chloride and their mixtures in accordance with Equations 2, 3 and 4, set forth above. These conditions are created by the use of activated silica in such forms as xerogel, aerogel, silica gel or "glaucosil" (Chem. Abs. Indexes 1926, 1927, 1933, 1937, 1938) at appropriate temperatures and pressures, as hereinafter set forth.

As is well known, activated silica has the property of sorbing many substances on its surface in a condensed phase or condition resembling solution under high pressure. This property is specific for each substance and of the reaction products cited above (Equations 1–4), chlorine is least, and water most highly sorbed. This property of silica exists over a wide temperature range and permits the sorption of the reactants at temperatures at which they would normally exist in the gas phase. Thus the benefits derived from the use of activated silica result from the intimate contact of reactants within extensive films of solutions whose compositions are favorably maintained by selective adsorption at the elevated temperatures conducive to oxidation by nitric acid.

In operating my process the chlorine containing materials are mixed with oxygen or oxygen containing gas and passed over a bed of moistened activated silica. The chlorine, nitric acid, nitrogen peroxide and water formed by the reaction issue from the bed together with any unreacted nitrosyl chloride or hydrogen chloride. This mixture is treated by known means for separation of the chlorine and other constituents. Unoxidized chlorides are recycled and the process repeated to completion.

I have found the usefulness of activated silica for this oxidation process to be limited by pressure and temperature considerations as follows: At atmospheric pressure the reactions occur in the presence of activated silica at temperatures between 46° and 160° C. At higher pressures temperatures above 160° C. are beneficial. The lowest temperature desirable for continuous operation is limited by the moisture content of the reacted gases. With nitrosyl chloride containing little moisture, 46° C. may be used as a minimum temperature, but when oxidizing hydrogen chloride a minimum temperature of substantially 83° C. is required to prevent excessive condensation of the water formed. When oxidizing a mixture of nitrosyl chloride and hydrogen chloride, a minimum temperature between 46° and 83° C. may be used at atmospheric pressure. For several obvious reasons it is desirable to operate the process above atmospheric pressure and at temperatures in excess of 83° C. It is necessary during continuous operation to maintain a high enough temperature to prevent excessive retention of moisture and low enough to permit satisfactory sorption and retention of the reactants. The optimum temperature, therefore, is a function both of the composition of the gas and the pressure employed.

From the foregoing, it is evident that in oxidizing dry nitrosyl chloride it is necessary to add a small amount of moisture to the catalyst bed to make up for evaporation. Similarly, when oxidizing pure hydrogen chloride, it is necessary to add a small amount of nitric acid, nitrosyl chloride or other form of nitrogen which will yield nitric acid under the conditions obtaining on the catalytic surface. Periodic reversal of the direction of gas flow within the bed tends to prevent loss of water or nitric acid, although under all ordinary conditions this is not necessary.

The following examples illustrate some methods of operation of my process.

Example 1

Substantially pure (98 per cent) chlorine-free liquid nitrosyl chloride was held in a bubble flask at a temperature of −19° C. Oxygen gas containing 2.5 per cent nitrogen was bubbled through the nitrosyl chloride to form a gas mixture composed of approximately ⅓ oxygen and ⅔ nitrosyl chloride by volume.

A mass of moistened glaucosil catalyst was held in a bed surrounded by an electric heating element for controlling the catalyst temperature; a mercury thermometer within the bed indicated the temperature at all times. The nitrosyl chloride-oxygen gas mixture passed over this catalyst at temperatures varying between 118° and 160° C. Reacted gas coming from the bed was condensed at −78° C. and samples of condensate were removed at definite bed temperatures. On analysis all samples showed substantial amounts of free chlorine.

Example 2

100 g. of activated silica gel moistened with ½ cc. of a 68 per cent nitric acid solution was held in a tube surrounded by an electric heating element. A gas mixture consisting of dry hydrogen chloride and dry oxygen containing 2.5 per cent nitrogen by volume was passed through the silica gel at a temperature of 87° C. Reacted gas issuing from the tube was condensed at −78° C. The first sample of condensate collected was essentially pure chlorine. Subsequent samples became increasingly contaminated with nitrogen peroxide. Traces of chlorine hydrate, $Cl_2 \cdot 8H_2O$, may also have been present in the condensate. At the end of 4½ hours of continuous operation all of the nitric acid had been removed from the bed by the gas stream, and no hydrogen chloride was being oxidized. About 5.5 g. of chlorine was produced during this period of operation.

It is obvious that these examples do not constitute the sole way of conducting the oxidation of nitrosyl chloride and hydrogen chloride by this process, and it is understood that changes in details may be made without departing from the invention or sacrificing the advantages thereof.

Throughout the specification and claims the terms "nitrosyl chloride" and "hydrogen chloride" are understood to refer to these materials in any degree of purity and are intended to include such contaminants as chlorine, nitrogen peroxide or water, which occur in these gases when they are produced by the interaction of alkali chlorides and nitric acid. Similarly, the term "oxygen" refers to pure oxygen or the oxygen of oxygen-containing gases, such as air. The term "nitrogen peroxide" refers to a mixture of nitrogen dioxide ($NO_2$) and nitrogen tetraoxide ($N_2O_4$).

Having thus described my invention, what I claim for Letters Patent is:

1. A process for the production of chlorine and nitrogen peroxide, which comprises mixing oxygen with the moist hydrogen chloride- and nitrosyl chloride-containing gases resulting from the reaction of alkali and/or alkaline earth chlorides with nitric acid, thence passing said gases over a siliceous adsorbent which is maintained at a temperature ranging between 46° C. and 150° C., thereby causing the moisture, oxygen, nitrosyl chloride, and hydrogen chloride to adsorb upon the siliceous adsorbent and form a liquid film in which the chloride content is oxidized to elemental chlorine and in which the nitrogen of the nitrosyl chloride is oxidized to nitrogen peroxide while the oxygen and moisture react with nitrogen peroxide, the while continuously withdrawing elemental chlorine, nitrogen peroxide, water, and unreacted gases.

2. A process for the production of chlorine and nitrogen peroxide, which comprises mixing oxygen with a gas composed of a mixture of the group consisting of hydrogen chloride, nitrosyl chloride, and chlorine, thence passing said gases over silica gel which is maintained at a temperature ranging between 46° C. and 150° C., thereby causing the moisture, oxygen, nitrosyl chloride, and hydrogen chloride to adsorb upon the silica gel and form a liquid film in which the chloride content is oxidized to elemental chlorine and in which the nitrogen of the nitrosyl chloride is oxidized to nitrogen peroxide while the oxygen and moisture react with nitrogen peroxide, the while continuously withdrawing elemental chlorine, nitrogen peroxide, water, and unreacted gases.

3. A process for the production of chlorine and nitrogen peroxide, which comprises mixing oxygen with the moist hydrogen chloride- and nitrosyl chloride-containing gases resulting from the reaction of alkali and/or alkaline earth chlorides with nitric acid, thence passing said gases over glaucosil which is maintained at a temperature ranging between 46° C. and 150° C., thereby causing the moisture, oxygen, nitrosyl chloride, and hydrogen chloride to adsorb upon the glaucosil and form a liquid film in which the chloride content is oxidized by the adsorbed nitric acid to elemental chlorine and in which the nitrogen of the nitrosyl chloride is oxidized by the adsorbed nitric acid to nitrogen peroxide while the oxygen and moisture react with nitrogen peroxide, thereby forming and constantly regenerating nitric acid upon the glaucosil; and, the while continuously withdrawing elemental chlorine, nitrogen peroxide, water, and unreacted gases.

DONALD L. REED.